United States Patent
Dery

(10) Patent No.: US 6,987,516 B2
(45) Date of Patent: Jan. 17, 2006

(54) RENDERING ANIMATED IMAGE DATA

(75) Inventor: Jean Luc Dery, St. Lambert (CA)

(73) Assignee: Autodesk Canada Co., Montreal (CA)

( * ) Notice: Subject to any disclaimer, the term of this patent is extended or adjusted under 35 U.S.C. 154(b) by 580 days.

(21) Appl. No.: 09/994,123

(22) Filed: Nov. 26, 2001

(65) Prior Publication Data

US 2002/0154133 A1 Oct. 24, 2002

(30) Foreign Application Priority Data

Apr. 19, 2001 (GB) .............................. 0109622

(51) Int. Cl.
G09G 5/00 (2006.01)

(52) U.S. Cl. ...................................... 345/582; 345/473
(58) Field of Classification Search ................. 345/582, 345/473, 419, 544, 505, 552; 710/22
See application file for complete search history.

(56) References Cited

U.S. PATENT DOCUMENTS

| 5,517,612 A | 5/1996 | Dwin et al. |
| 5,859,646 A | 1/1999 | Takenaka |
| 5,880,737 A * | 3/1999 | Griffin et al. ............... 345/582 |
| 6,133,923 A | 10/2000 | Ozawa |
| 6,157,384 A | 12/2000 | Oka et al. |
| 6,535,220 B2 * | 3/2003 | Deering et al. ............. 345/582 |
| 6,677,955 B1 * | 1/2004 | Morioka ..................... 345/552 |

FOREIGN PATENT DOCUMENTS

| EP | 0890925 A2 | 1/1999 |
| GB | 2351640 A | 1/2001 |

* cited by examiner

Primary Examiner—Matthew C. Bella
Assistant Examiner—Dalip K. Singh
(74) Attorney, Agent, or Firm—Gates & Cooper LLP

(57) ABSTRACT

Animation data is rendered in real time. Animated scenes include at least one texture-mapped surface (502). Each scene is rendered on demand, in immediate continuation from the last, and results of scene animation may be combined with image data from another real time image source. Textures (921) are pre-loaded into a texture memory (809) before a scene containing them is rendered. As a result of the necessity to perform rendering (1521) in real time, each frame has an available bandwidth (1501) for transferring a texture to the texture memory. Estimates of available bandwidth are generated (1302) by an adaptive statistical model. A texture required for transfer is split (1307) into portions (1801) that are transferred (1511) as a background operation, while real time rendering continues without loss of rendering quality.

25 Claims, 17 Drawing Sheets $$N_{min} = \frac{SIZE}{BANDWIDTH}$$

where BANDWIDTH is the number of bytes that it is predicted can safely be transferred before the end of each frame, and SIZE is the number of bytes in the texture.

| 1801 | 1802 | 1803 | 1804 |
|------|------|------|------|
| 1805 | 1806 | 1807 | 1808 |
| 1809 | 1810 | 1811 | 1812 |
| 1813 | 1814 | 1815 | 1816 |

1001

*Figure 18*

RENDERING ANIMATED IMAGE DATA

BACKGROUND OF THE INVENTION

1. Field of the Invention

The present invention relates to loading image textures for an animation, and in particular to pre-loading textures for animations that are to be performed in real time.

2. Description of the Related Art

The use of subtitles in everyday television broadcasts has become widely accepted. As digital methods have become increasingly inexpensive and fast, subtitling has expanded into a wide range of animated graphics that can be used to accompany a broadcast. These animations may be of sufficient complexity that they must be prepared in an off-line environment before being committed to an on-air broadcast. However, many such broadcasts have unpredictable cue points in time, and as such are unsuitable for use with pre-prepared material of this kind. In order to maximise the impact and inter-activity of the images in a live broadcast, it is necessary to generate animations interactively in real time; effectively a performance of the cameras, talent and the production team all working together. Cues are then supplied to the animation system to initiate an animation sequence, or a scene.

While the amount of processing power currently available is considerable, general purpose computing platforms have not been specifically designed for real time image processing. In particular, the amount of data that is transferred during routine data processing operations can interfere with time critical tasks, such as the completion of rendering of the next frame during a live broadcast. Efficient moving of data requires the use of hardware methods of direct memory access (DMA) which are difficult to interrupt. Use of highly efficient DMA transfers is necessary because of the volume of data involved in image processing. However, unrestricted use of DMA prevents the system from operating in real time. Using slower non-DMA methods also restricts real time operation, because the rate of data transfer is then reduced.

Restricting the amount of data that can be moved about during real time operation can interfere significantly with the capabilities of the system, and also has the disadvantage that the users of such restricted systems must be made aware of highly technical issues, issues that will interfere with the creative act of designing an animated scene for a television broadcast.

BRIEF SUMMARY OF THE INVENTION

According to an aspect of the present invention, there is provided apparatus for rendering animated image data in real time, comprising: central processing means, data storage means, graphical processing means, and texture storage means, said data storage means for storing data including scene data, that defines a plurality of sequentially displayable scenes, each of which will be rendered as an image sequence in real time; data for each said scene including a texture for the respective scene, that requires transfer to said texture storage means in advance of its rendering; said central processing means and said graphical processing means being configurable to perform operations to render said scenes, without a pause between scenes, said operations being under control of said central processing means, which is configurable to execute instructions for performing steps of: (a) rendering the next frame of the current scene; (b) estimating a bandwidth availability for texture transfer that is unlikely to interfere with real-time rendering of the current scene; (c) identifying the amount of data in a texture required for rendering a next scene; (d) splitting said required texture into texture portions that satisfy said bandwidth availability; and (e) transferring a said texture portion from said data storage means to said texture storage means.

BRIEF DESCRIPTION OF THE SEVERAL VIEWS OF THE DRAWINGS

FIG. 18 illustrates the effect of the step of splitting textures into portions shown in FIG. 13.

BEST MODE FOR CARRYING OUT THE INVENTION

FIG. 1

Figure 1:
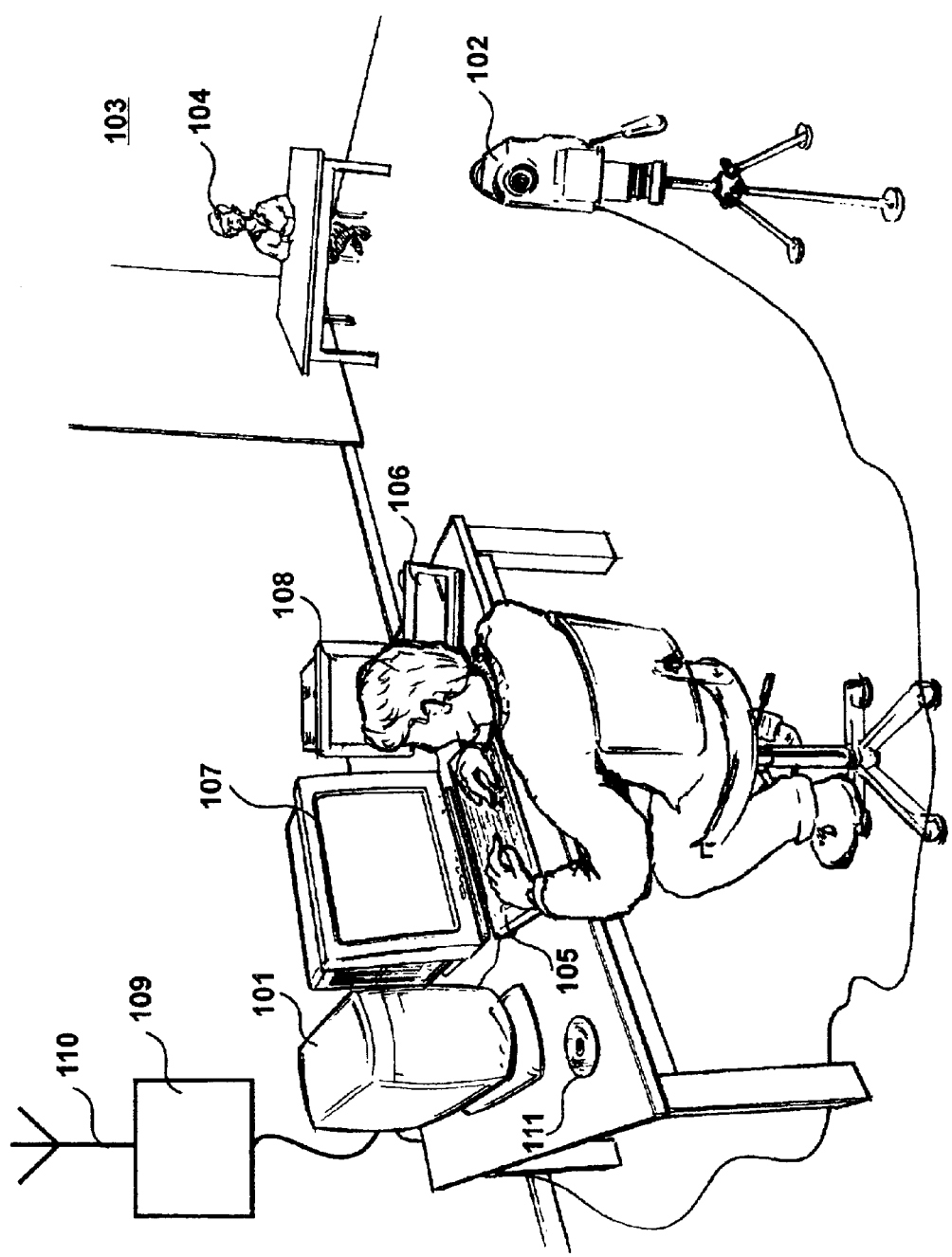
FIG. 1 shows equipment used for generating animations in real time, including a processing system and a monitor.

A system for rendering animated image data is shown in FIG. 1. A processing system 101 receives incoming image signals from a television camera 102 located in a studio 103. The camera is aimed at talent 104, for example, a person who reads the daily news for a television station. The talent 104 may be backed by a blue screen background, which may be substituted in the processing system 101 for various images, including an image of a virtual studio. When generating images for a virtual studio, the camera 102 also supplies zoom, angle, focus and location data to the processing system 101, so that movements and adjustments of the camera are reflected in appropriate changes to the appearance of the virtual studio. In addition to receiving camera signals, the processing system 101 also receives input signals from a keyboard 105 and a graphics tablet 106. A user interacts with the processing system 101 via these input peripherals, facilitating the setup and combination of complex animated scenes, that are super-imposed upon images from the camera 102 in real time. In the preferred embodiment, the processing system 101 is an Octane™ produced by Silicon Graphics Inc.

A graphical user interface is supplied to the user on a visual display unit (VDU) 107, which also provides high quality preview of animation results. A broadcast monitor 108 shows the resulting image as it will be viewed on an ordinary television set. Broadcast video signals supplied to the broadcast monitor 108, are also supplied to a production unit 109, including production personnel, digital video tape recording machines, digital video mixers, and so on. Thereafter, once everything has been mixed, resulting video and audio signals are converted to radio-frequency and broadcast from a transmitter 110.

In the arrangement shown in FIG. 1, it is intended that the performance of the talent 104 should be coupled to animations of digitally generated scenes, which are then superimposed. This places a requirement upon the processing system 101 that there should be reliable continuous generation of digital animation scenes, so that the resulting images do not pause, slow down, or flicker. A similar requirement may exist even when there is no studio 103 or talent 104. Under many circumstances, it is desirable to generate high quality animations in real time, and with guaranteed reliability. Instructions for enabling the processing system 101 to perform such real time operations are stored on a CDROM 111, and are permanently installed on the processing system 101 by placing the CDROM 111 in a CDROM drive in the processing system 101.

FIG. 2

Figure 2:
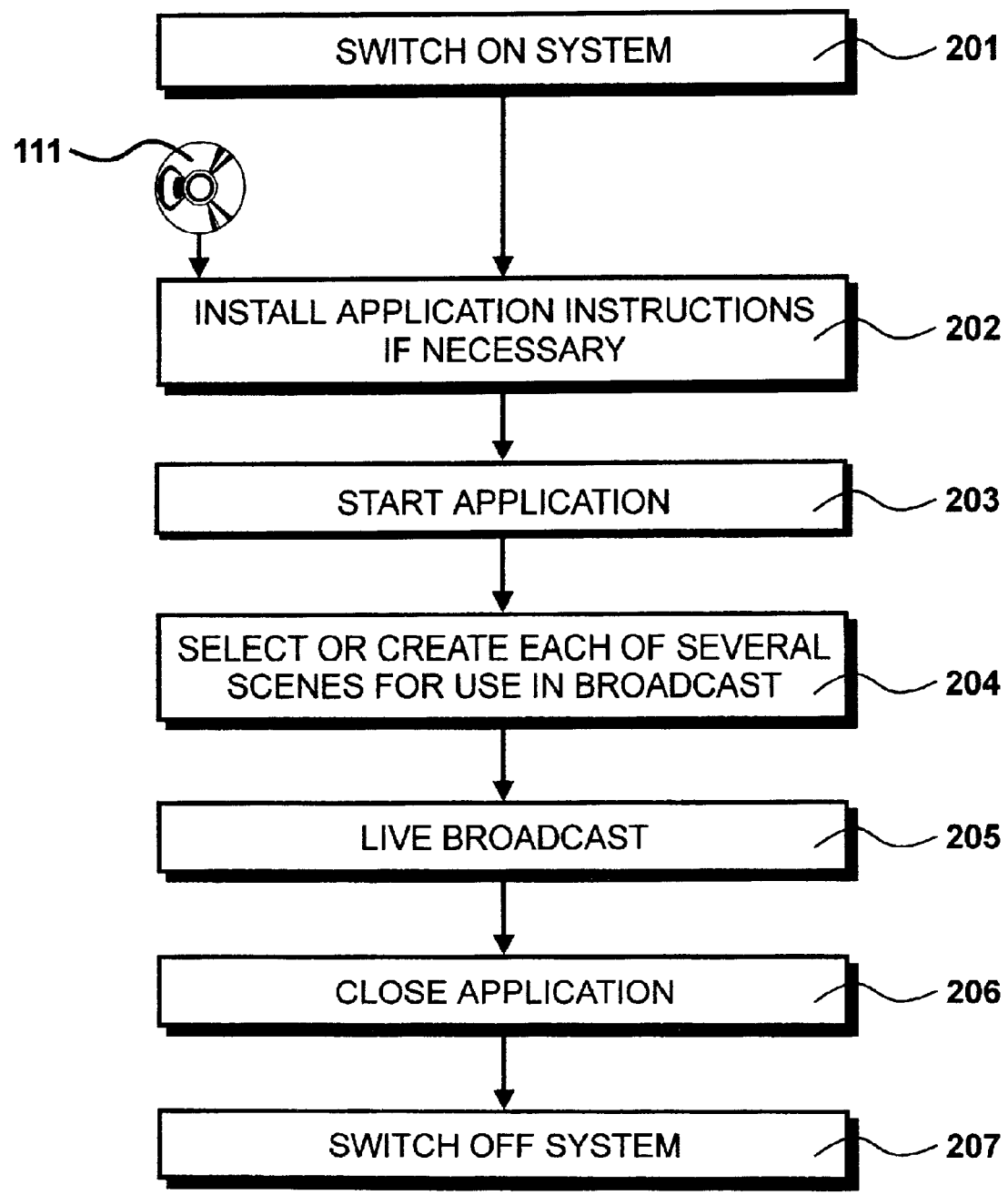
FIG. 2 details steps performed by the user of the processing system shown in FIG. 1, including a step of live broadcast.

A summary of operations performed using the equipment shown in FIG. 1 is shown in FIG. 2. At step 201 the processing system 101 is switched on and initialised. At step 202 instructions for generating real time animations are installed from the CDROM 111 if necessary. Alternative sources of these instructions might be from another processing system or a storage device or a network connection, the Internet, or from some other data transfer medium. The instructions may be stored or transferred in a compressed data structure, which may be expanded as required during installation and or instruction execution.

At step 203 the animation application instructions are started. At step 204 several scenes are selected or created by the operator, in preparation for a live broadcast. At step 205 the animations are combined with live video data during a live broadcast. At step 206 the animation application is closed, and at step 207 the processing system 101 is closed down. Steps 204 and 206 are not compulsory. A user can generate, prepare or download scenes during a first session, and store the scenes for subsequent use. Equally, a live broadcast may be performed using a set of scenes that has been prepared at an earlier date.

FIG. 3

Figure 3:
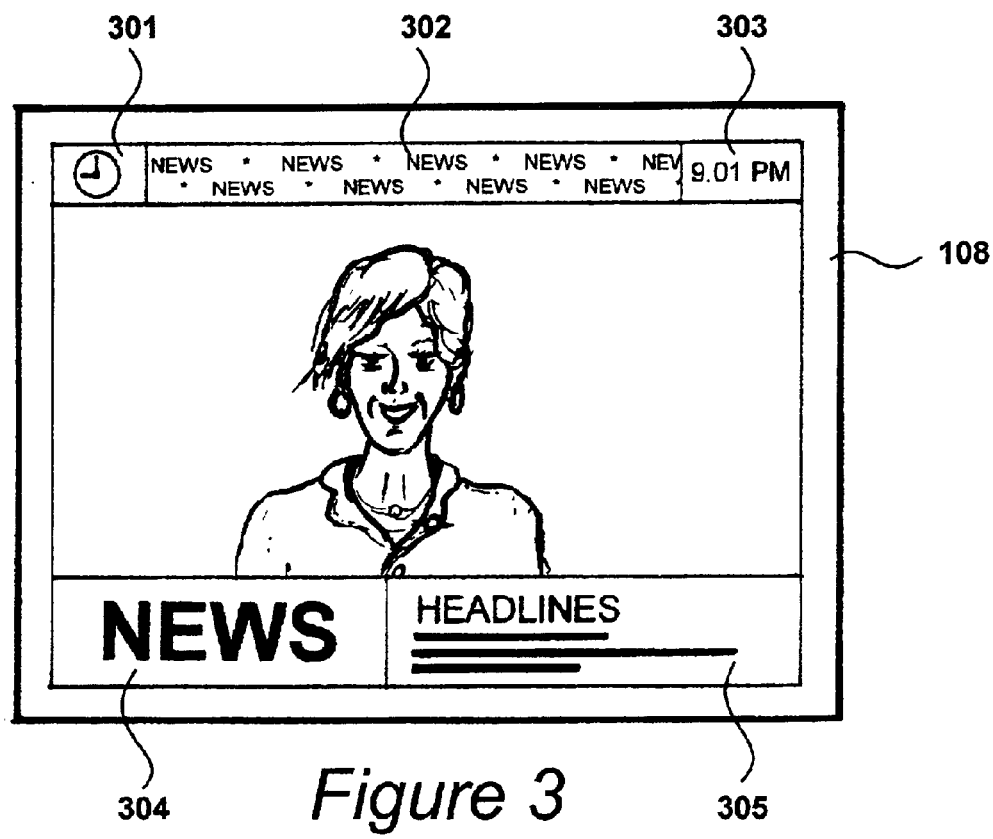
FIGS. 3 to 6 illustrate scenes that are displayed on the monitor shown in FIG. 1 during the step of live broadcast shown in FIG. 2, including texture mapped surfaces.

Examples of combined animation and camera broadcast images are shown in FIGS. 3 to 6. Most of these scenes are simple, having mainly two-dimensional animations. However, the animation application instructions are capable of generating fully three dimensional animated images in real time. In FIG. 3, a news reader 104 occupies the central part of the screen. Several animations are super-imposed upon the camera image, as shown at 301, 302, 303, 304 and 305. These may be updated from frame to frame as the live broadcast proceeds.

FIG. 4

Figure 4:
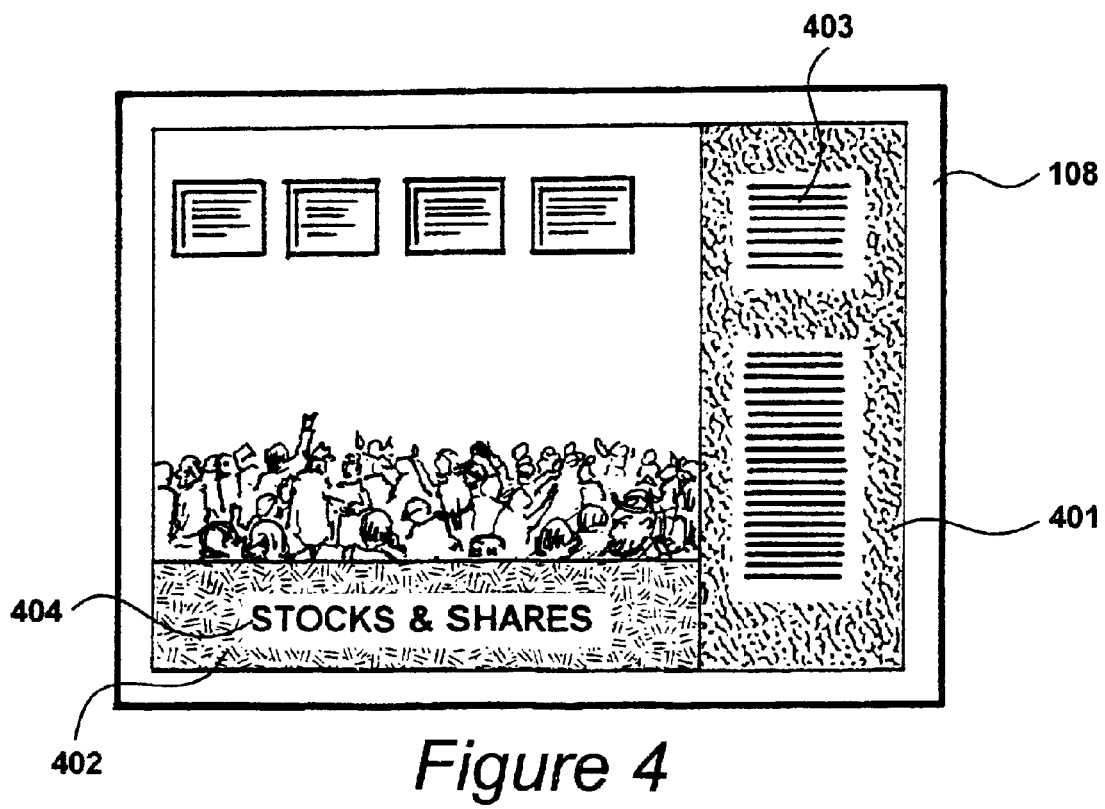

FIG. 4 introduces texture maps 401 and 402, which are used as a complex background to some dynamically updated text fields at 403 and 404. At 404, the text scrolls continuously, giving high and low values of stocks and shares. At 403, the text is static, but has a dynamic lighting effect that changes smoothly over time.

FIG. 5

Figure 5:
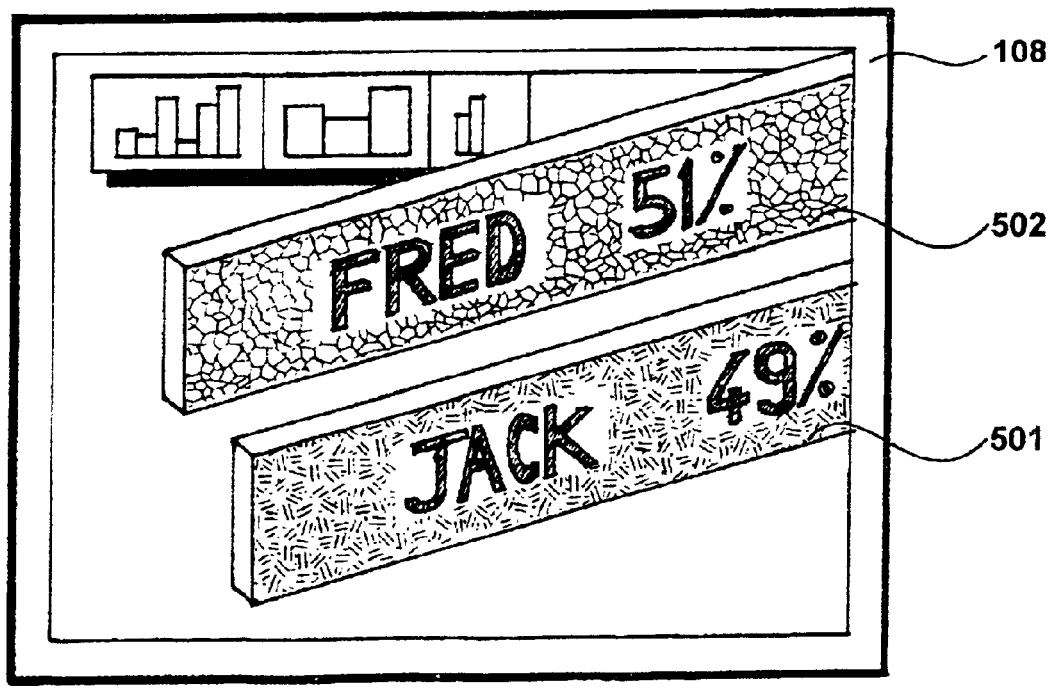

FIG. 5 illustrates an animation-only scene, where no camera image is used. This is a scene in the same broadcast. Two different textures 501 and 502 are used here, that are mapped to a couple of animated surfaces that change position and rotation in three dimensions over time, giving a dramatic effect.

FIG. 6

Figure 6:
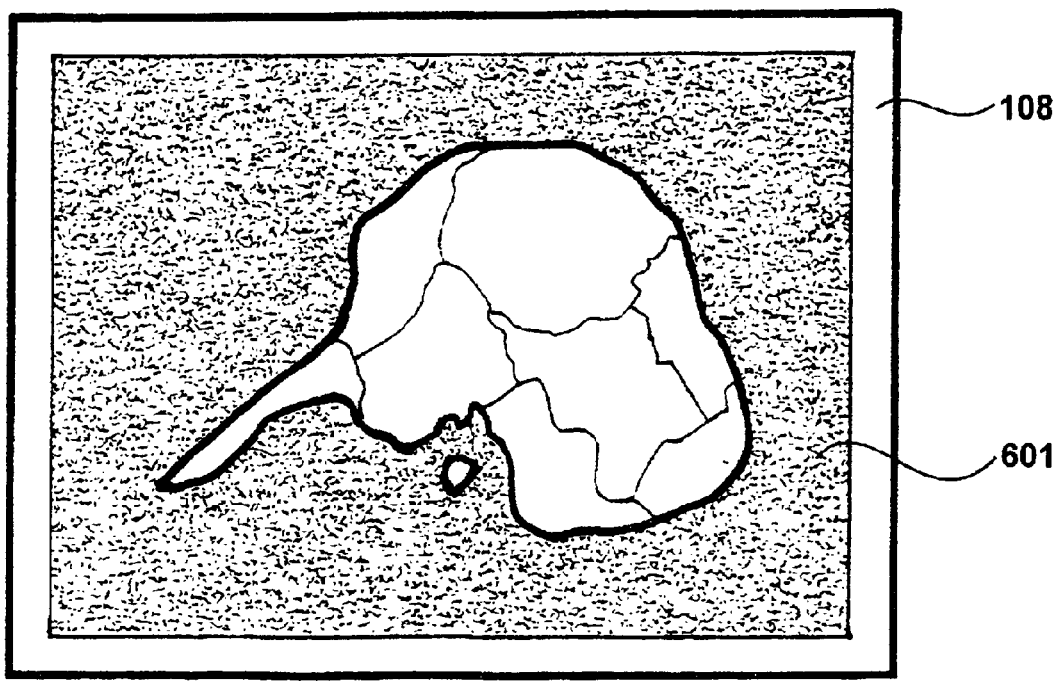

FIG. 6 shows another animation-only scene having a background that is entirely defined by a texture 601.

FIGS. 3 to 6 depict four separate scenes, each of which is displayed in sequence during the live broadcast. Switching between scenes is performed manually by an operator of the processing system 101. When the operator requests the next scene, it is essential that this be displayed immediately, in order to avoid interrupting the flow of the broadcast. Each scene can therefore last an unpredictable amount of time, and must be responsive to changing unpredictable requirements as the broadcast takes place. An operator may cue scenes for broadcast, but cannot predefine when a switch between scenes will actually take place.

FIG. 7

Figure 7:
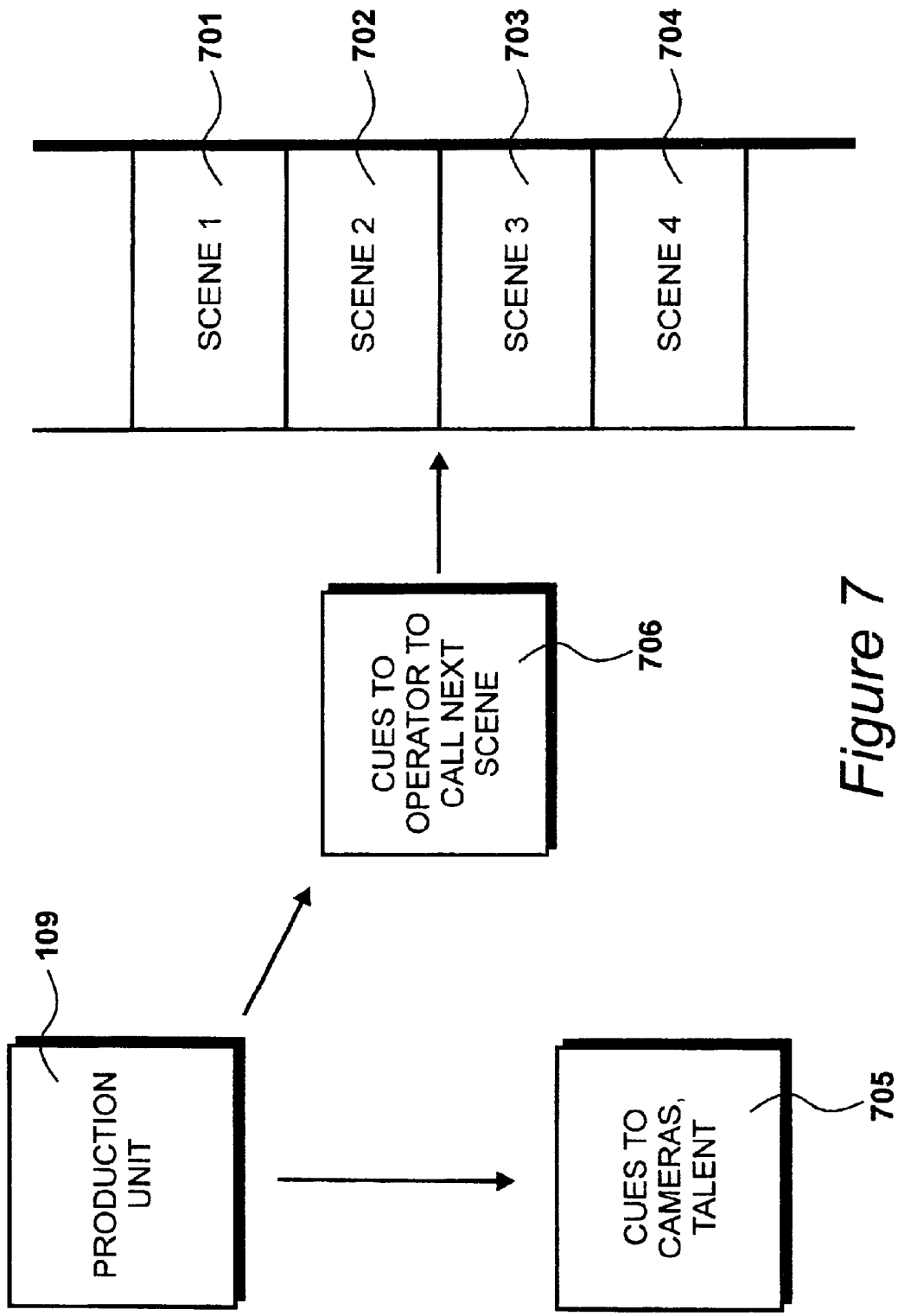
FIG. 7 summarises production operations performed during the live broadcast shown in FIG. 2.

The sequence of events performed during a live broadcast 205 is summarised in FIG. 7. Scenes one to four, indicated at 701 to 704, are called in a sequence decided and initiated by personnel in the production unit 109. Cues are sent to the camera and talent, as indicated at 705, resulting in appropriate performance and camera actions. Cues are also supplied to the operator of the processing system 101, as indicated at 706. These cues result in the next scene being selected, at the same time as appropriate actions are being performed by the talent and the camera operator. Scene cues are usually performed in a fixed order, although this is not strictly necessary. However, the time at which a next scene is selected is not usually known in advance, and so it is essential that transition between scenes is completely smooth.

The amount of data required for each scene is large. The processing system 101 may be able to prepare to display a next scene while a current scene is being rendered. However, a processing system of the type shown in FIG. 1 is usually unable to prepare all data for all scenes before a broadcast, and so an inherent requirement of the processing system 101, is that it should be able to load scene data at the same time as rendering a scene. Known systems provide this facility by prioritised multiple processes. However, as will be shown, this technique results in occasional rendering interference, with the result that animations must either be restricted in their complexity, or a reduction in the rendering quality must be tolerated.

FIG. 8

Figure 8:
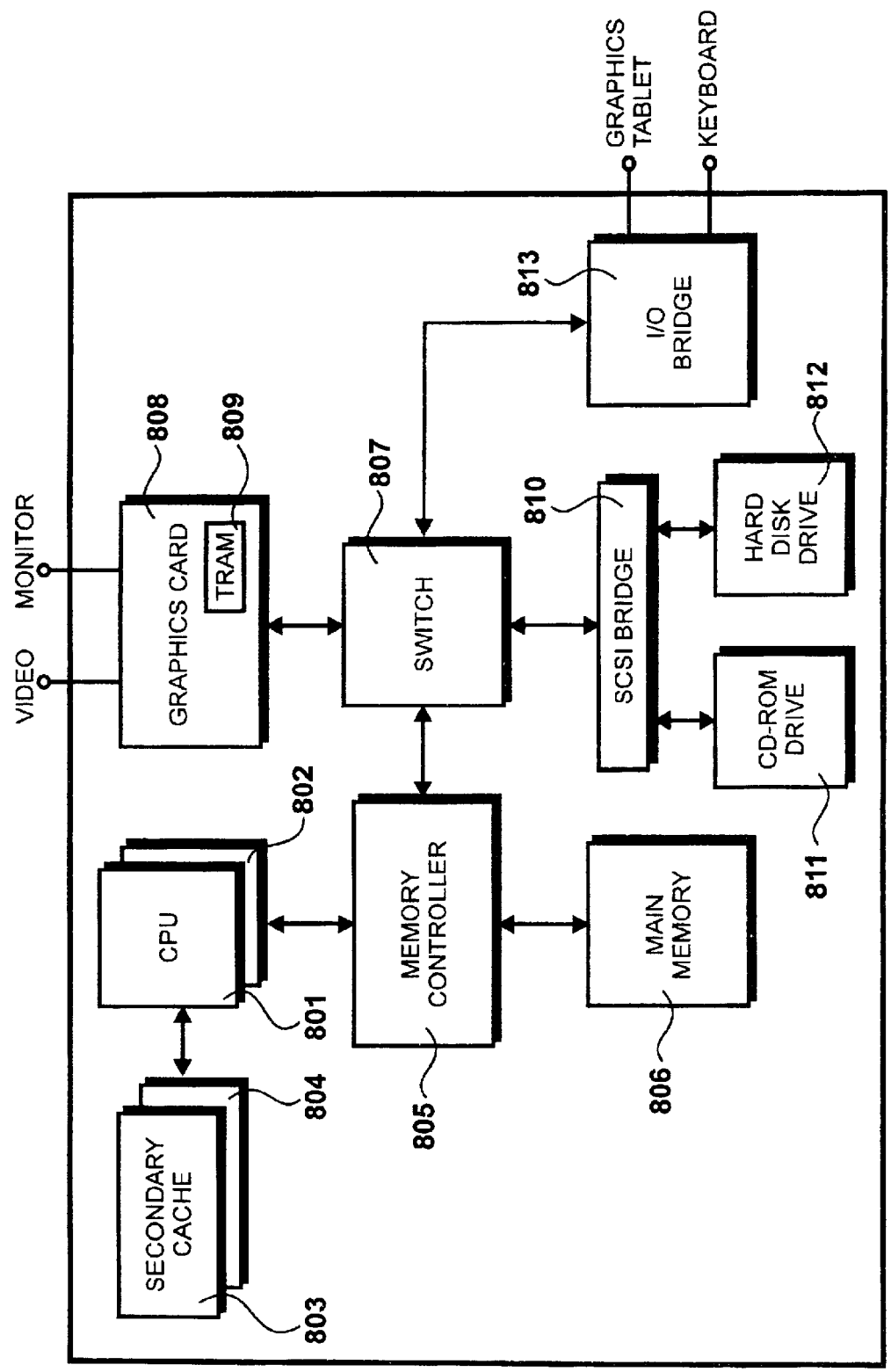
FIG. 8 details hardware components of the processing system shown in FIG. 1, including a main memory and a texture memory.

The processing system 101 shown in FIG. 1 is detailed in FIG. 8. The processing system 101 comprises two central processing units 801 and 802 operating in parallel. Each of these processors is an MIPS R12000 manufactured by MIPS Technologies Incorporated, of Mountain View, Calif. Each of these processors 801 and 802 has a dedicated secondary cache memory 803 and 804 that facilitate per-CPU storage of frequently used instructions and data. Each CPU 801 and 802 further includes separate primary instruction and data cache memory circuits on the same chip, thereby facilitating a further level of processing improvement. A memory controller 805 provides a common connection between the processors 801 and 802 and a main memory 806. The main memory 806 comprises two gigabytes of dynamic RAM.

The memory controller 805 further facilitates connectivity between the aforementioned components of the processing system 101 and a high bandwidth non-blocking crossbar switch 807. The switch makes it possible to provide a direct high capacity connection between any of several attached circuits. These include a graphics card 808. The graphics card 808 generally receives instructions from the processors 801 and 802 to perform various types of graphical image rendering processes, resulting in images, clips and scenes being rendered in real time. The graphics card also includes a texture memory (TRAM) 809, in which are stored texture maps for objects that are drawn in response to instructions from the processors 801 and 802.

A SCSI bridge 810 facilitates connection between the crossbar switch 807 and a CDROM drive 811. The CDROM drive provides a convenient way of receiving large quantities of instructions and data, and is typically used to install instructions for the processing system 101 onto a hard disk drive 812. Once installed, instructions located on the hard disk drive 812 may be transferred into main memory 806 and then executed by the processors 801 and 802. An input output (I/O) bridge 813 provides an interface for the graphics tablet 106 and the keyboard 105, through which the user is able to provide instructions to the processing system 101.

Instructions for graphics operations, performed by the graphics card 808 are typically in the form of commands to draw shapes, such as circles, lines, polygons and so on. These are known as primitives. Furthermore, these primitives may be surfaces in a three dimensional space, and the projection of this three dimensional space is performed by the graphics card processing circuitry. As each new frame is created, the primitive shapes and surfaces may be redrawn with slightly different parameters, resulting in an animation. With a constant refresh rate of sixty hertz, for NTSC, or fifty hertz for PAL, broadcast quality animations are generated in real time. This requires that all the primitives that are required to generate a single frame, are drawable within each sixty hertz cycle, or approximately 16.67 milliseconds. The resulting scene can then be superimposed upon signals arriving from the camera 102 or other source of live video data. This mixing process is performed using known bluescreen studio methods and equipment located in the production unit 109.

All processing, including the partial downloading of a next scene, must be performed within this time period. Failure to meet the due time for each frame results in a loss of smoothness in the animation. If this occurs more than once or twice, the result is an extremely poor quality of animation. However, even the loss of one frame's deadline is to be avoided in high quality applications.

Not all patterns need to be animated, and many surfaces have complex characteristics that do not need to change from frame to frame. In order to provide this level of complexity, while reducing the effort of computing each new frame, a surface can be texture mapped. A texture is a predefined pattern, usually in two dimensions, which can be mapped to a surface. It comprises pixels, each of which may have attributes of color. An example is a two hundred and fifty-six by one hundred and twenty-eight pixel texture, with each pixel having a byte each for red, green and blue color components. Texture pixels are usually called texels. The surface to be texture mapped may be represented by a polygon, for example a rectangle. The command to draw the rectangle, issued to the graphics card 808, includes a request for the rectangle to be texture mapped, using a particular texture. Each time the rectangle is drawn, the texture is automatically rendered over its surface, thus enabling complex surface textures to be rendered without the expense of creating the surface details each time it is drawn. A texture-mapped surface is warped and modified in accordance with any of the three dimensional transformations and projections that are defined for the shape said surface is applied to.

The textures that are applied during texture mapping are stored in the graphics card in dedicated texture memory (TRAM) 809. In the preferred embodiment, the texture memory is one hundred and twenty-eight megabytes of fast access RAM. It is thus possible to store many different and highly detailed textures in TRAM, and thereby achieve a high degree of complexity and subtlety in the resulting animated images, even with the requirements of real time rendering.

Once the texture memory has been loaded with all the textures for a scene, the rendering process can take place without interruption. However, the texture memory 809 cannot store an unlimited quantity of textures. While one hundred and twenty-eight megabytes may be plenty for a single scene, it will quickly be used up over several scenes. In practice, many scenes are required during a live broadcast, with the result that it will almost certainly become necessary, at some stage, to dynamically load new textures into texture memory, as the broadcast proceeds.

It is possible that, during a particular live broadcast, there will be a break between scenes, which would enable an operator to choose new scenes to download. However, this would be very unsatisfactory. In practice, therefore, it will be necessary to preload new scenes while a current scene is being rendered. Preloading for a new scene will, by necessity, include the preloading of texture memory 809 with the textures for the new scene.

A texture is usually a two dimensional array of texel values. A typical texture might be 256 by 256 texels in size, having eight bits for each of red, green, blue and opacity, requiring thirty-two bits per texel. This results in a total texture size of two hundred and fifty-six kilobytes.

After rendering a single frame, at a rate of sixty frames per second, one might expect a certain percentage of the 16.67 mS time period to be available for a texture download. For example, perhaps 5 mS is available.

The transfer rate to texture memory 809 from the main memory 806 is dictated by hardware. In the preferred embodiment, the maximum rate is given by a direct memory access (DMA) transfer, and this is approximately 25 Kbytes/mS.

In the 5 mS assumed to be available, a total of 125 Kbytes can be transferred, which is only half of the texture. Furthermore, the 5 mS figure is just a guess. In reality, the available bandwidth varies dramatically. Sometimes practically no bandwidth is available at all.

Direct memory access transfers are efficient because they cannot usually be interrupted by other processes. However, because the graphics card only has one channel of data transfer, if this is performing an uninterruptable DMA for a texture transfer, then any attempt to transfer too much texture will result in the next frame deadline being missed. Thus, any attempt to use more than the available bandwidth results in the duplication of the previous frame in the next frame, which is observable as a lack of smoothness in the resulting animation.

In the invention, a bandwidth availability for texture transfer is estimated, and the texture is split up into individually transferable texture portions, each of which is statistically highly likely to be transferable within the available bandwidth in each of the following frames. This makes it possible to preload textures while a current scene is being rendered, without interfering with real time operations. The bandwidth availability is estimated by a process of adaptive statistical analysis, which has as its input, the actual bandwidth availability observed in previous frames.

FIG. 9

Figure 9:
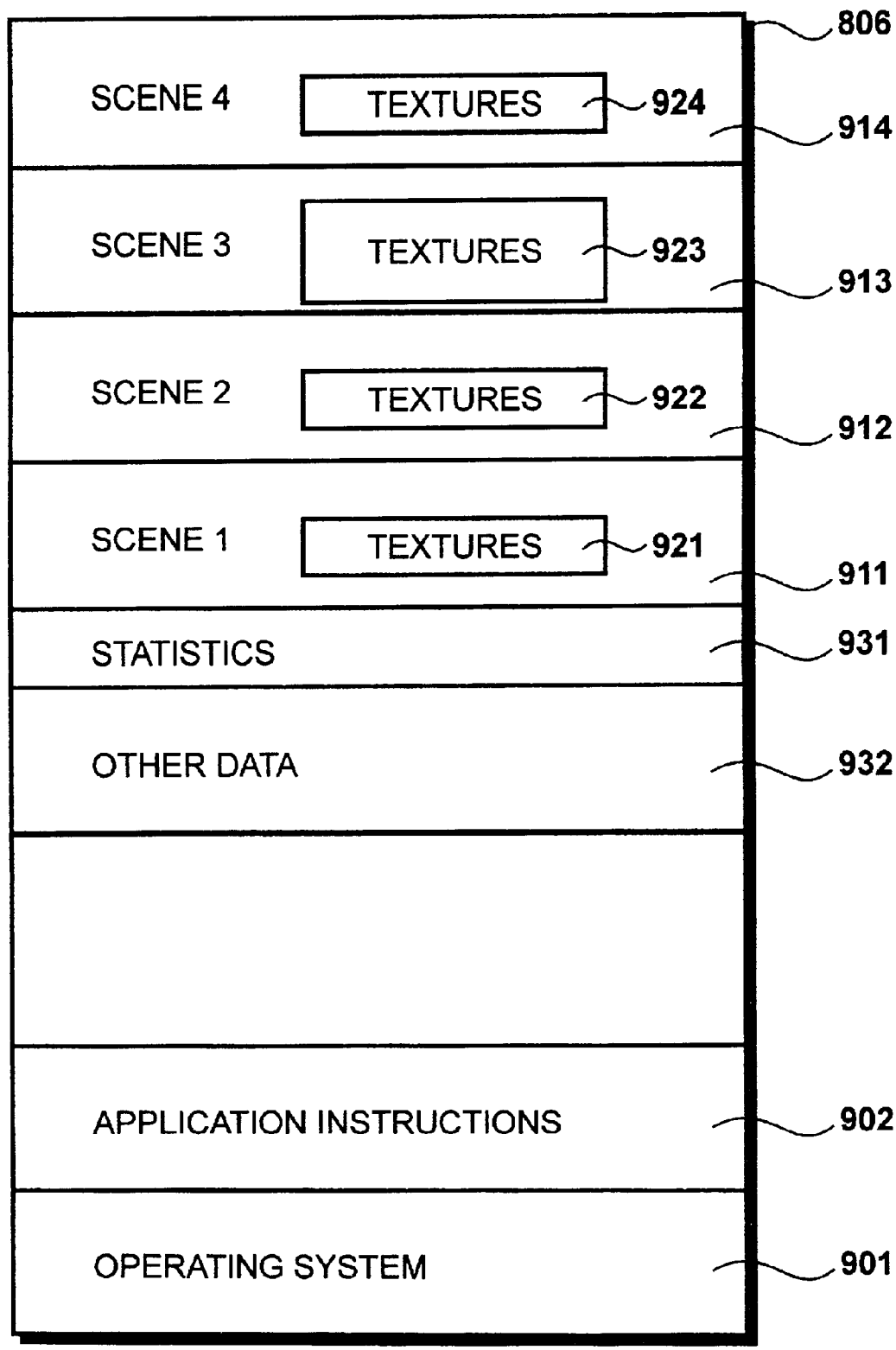
FIG. 9 details the contents of the main memory shown in FIG. 8, including scene data.

The contents of the main memory 806 during a live broadcast, are shown in FIG. 9. An operating system 901 provides common application functionality, as well as software interfaces to the various components of the processing system 101 as shown in FIG. 8. The operating system is Irix™ available from Silicon Graphics Incorporated. Application instructions 902 include all the instructions required to facilitate creation, loading, interfacing and rendering of animated scenes in accordance with the invention.

Data that defines each of four scenes is shown at 911, 912, 913 and 914, along with respective textures 921, 922, 923 and 924. Statistics 931 include data for predicting the available bandwidth for texture transfer, without violating the requirement for real time rendering. Other data includes data structures and storage used by various components of the operating system 901, as well as the application instructions 902.

FIG. 10

Figure 10:
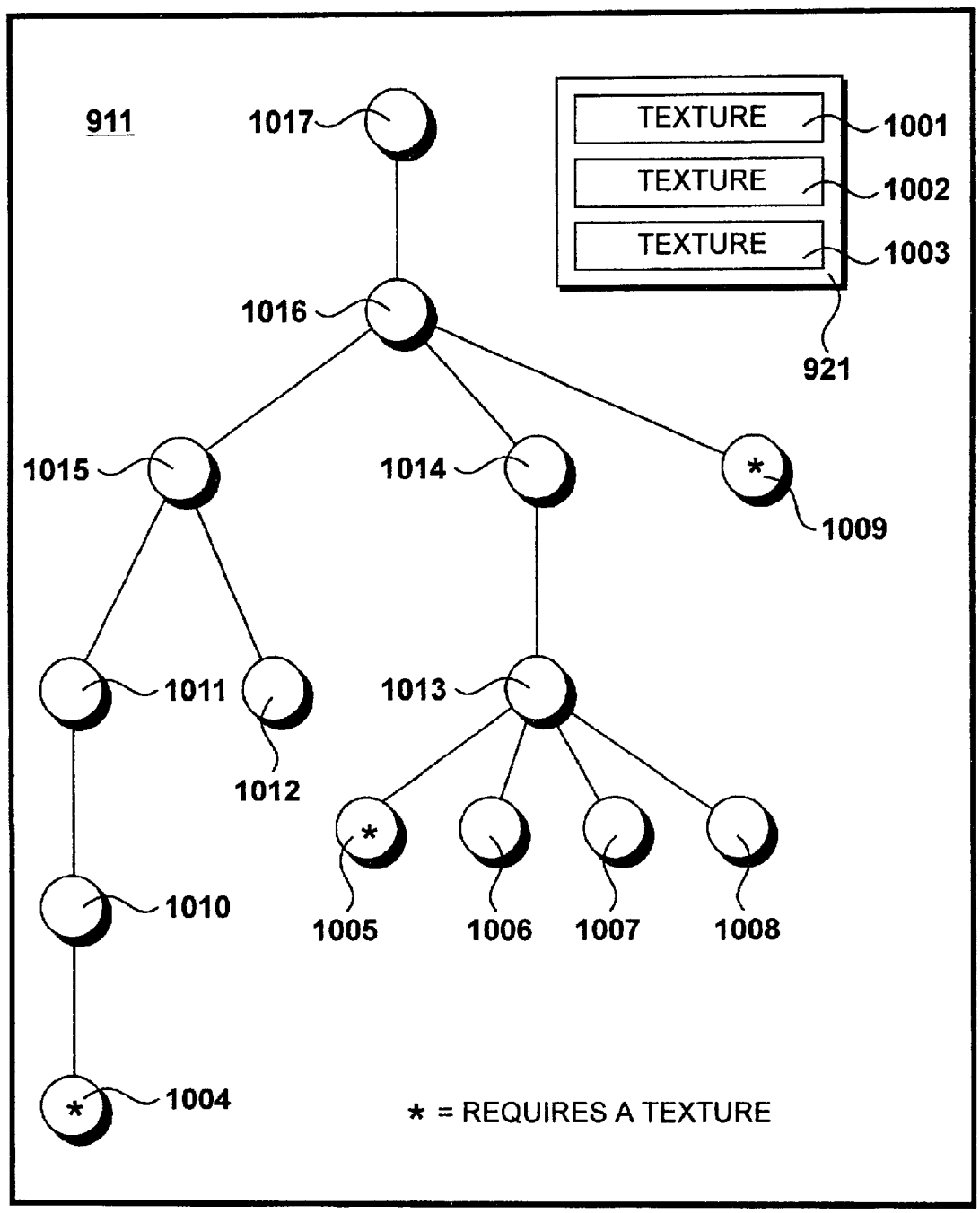
FIG. 10 details the scene data shown in FIG. 9, including a texture.

A diagrammatic representation of the data 911 for scene one is shown in FIG. 10. The texture data 921 comprises three textures 1001, 1002 and 1003. The data for the scene is stored in the form of a hierarchical scene graph. Each of the nodes 1004 to 1017 defines a shape. Node 1013 defines a shape comprising four primitives 1005, 1006, 1007 and 1008. Primitive 1005 is a texture mapped rectangle. Nodes 1004 and 1009 also require texture maps. The three textures 1001 to 1003 are assigned respectively to nodes 1004, 1005 and 1009.

FIG. 11

Figure 11:
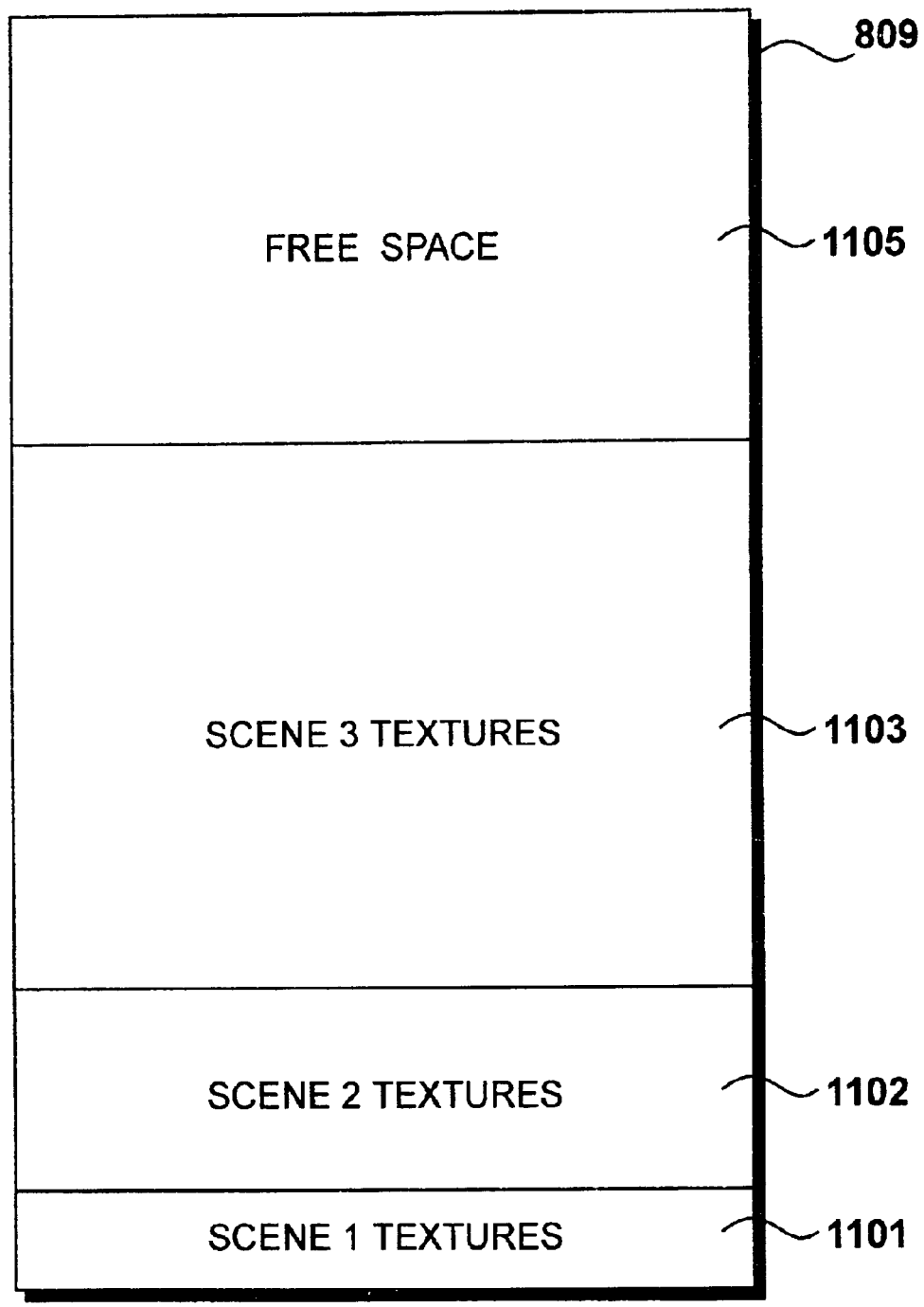
FIG. 11 details the contents of the texture memory shown in FIG. 8.

The contents of the texture memory 809 shown in FIG. 8, at the time of a live broadcast, are detailed in FIG. 11. Textures for scenes one, two and three have been loaded into memory areas 1101, 1102 and 1103. However, textures for scene four are not loaded. FIG. 11 illustrates a problem, in that the textures for scene four may possibly be larger than the free space 1105 that is currently available in texture memory 809. Thus, not only is there the problem of pre-loading textures without interfering with real time rendering of the current scene, there is also a requirement to remove textures from texture memory 809, in order to maximise the amount of space available. This operation requires memory management operations to be performed. Although texture memory management consumes less time than loading a texture, it still consumes significant time, which may possibly interfere with rendering of the current scene. Thus, the invention further facilitates safe deletion of textures from texture memory, without interfering with real time rendering of the current scene.

FIG. 12

Figure 12:
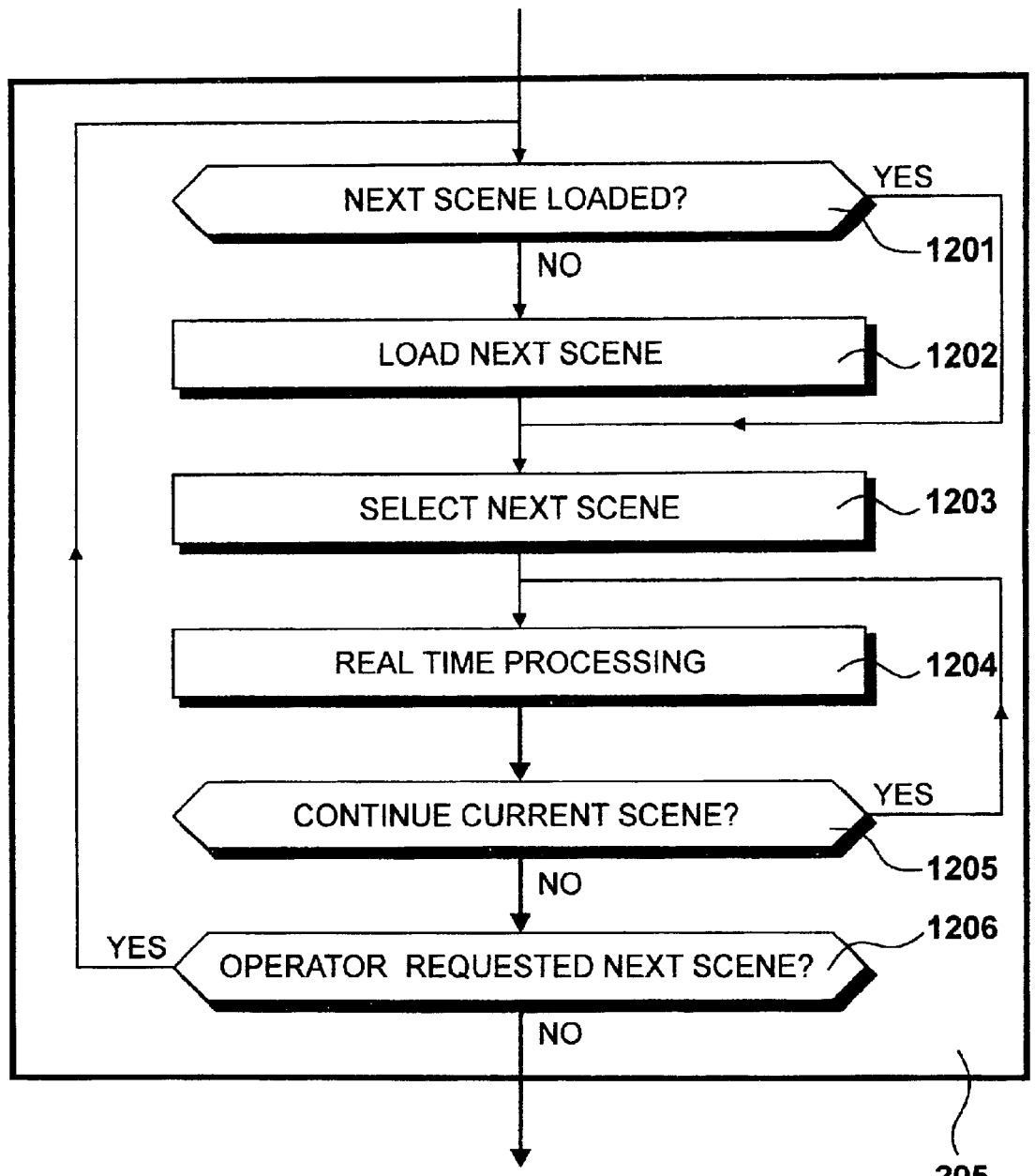
FIG. 12 details the step of the live broadcast shown in FIG. 2, including a step of real time processing.

The steps performed during the live broadcast 205, shown in FIG. 2, are summarised in FIG. 12. At step 1201 a question is asked as to whether the next scene has been loaded. Initially the answer will be no, and control is directed to step 1202, where the first scene is loaded. Loading includes transfer of textures to texture memory 809 in the graphics card 808. All loading is performed as a background operation.

At step 1203, once the first scene has been loaded, this scene is selected as the current scene. At step 1204, real time processing is performed, including the rendering of the current scene, and the background pre-loading of subsequent scenes, up to the memory capacity of the available storage. Background pre-loading includes the preloading of textures, in which textures are transferred to the texture memory 809. Step 1204 lasts for the duration of a single frame.

At step 1205 a question is asked as to whether the current scene should be continued. Usually the answer will be yes, and control is directed to step 1204, where the next frame for the current scene is rendered. At step 1206 a question is asked as to whether the operator requested a next scene to be rendered. If so, control is directed to step 1201. At step 1201 a question is asked as to whether the next scene is loaded. The next scene should have been completely loaded as part of the background operations performed at step 1204. However, in case it has not, control can be directed to additional loading at step 1202, where the remainder of the scene is transferred into memory and initialised, including the transfer of any remaining textures into TRAM 809. Usually the next scene will have been completely loaded anyway, in which case control is directed to step 1203 where the next scene is selected as the present scene, and operations continue as previously described. Eventually, at the end of the broadcast, the question asked at step 1206 will be answered in the negative, and this completes the summary of the steps that are performed by the processing system 101 during a live broadcast 205.

FIG. 13

Figure 13:
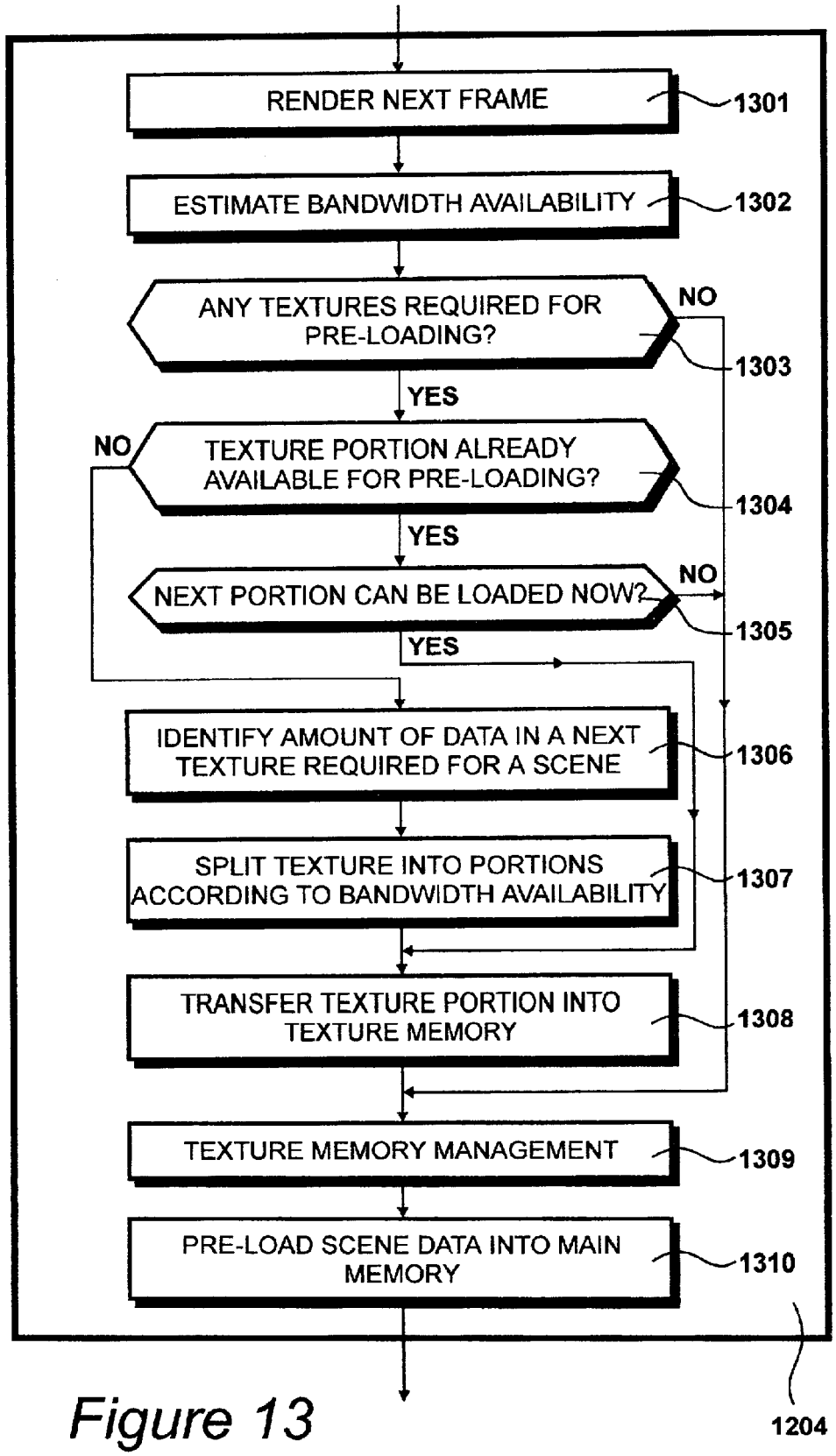
FIG. 13 details the invention, which is a detail of the step of real time processing shown in FIG. 12, including a step of estimating bandwidth, a step of splitting a texture into portions and a step of texture memory management.

The invention is summarised in FIG. 13. This Figure also provides a detail of step 1204, real time processing, shown in FIG. 12. The steps shown in FIG. 13 are performed by one of the central processors 801 or 802, or possibly both. At step 1301 the next frame is rendered. This involves interpreting the scene graph data structure for the scene, as shown in FIG. 10, animating the parameters for each of the nodes in the scene graph, and transmitting the resulting draw commands to the graphics card 808. As a precursor step, the graphics card will have swapped its front and back buffers, thus making the previously drawn frame available for broadcast. The process of constructing the next frame is hidden, because the draw commands draw to the back buffer.

At step 1302 the bandwidth availability is estimated. At step 1303 a question is asked as to whether any textures are required to be pre-loaded into texture memory. If so, control is directed to step 1304. Alternatively, control is directed to step 1309. At step 1304 a question is asked as to whether a texture portion is already available for pre-loading. If so, control is directed to step 1305. Alternatively, control is directed to step 1306. At step 1305 a question is asked as to whether the next portion can be pre-loaded now. This is evaluated according to whether the texture portion can be transferred within the available time before the next frame is required. This evaluation is performed by comparing the size of the texture portion with the estimate provided at step 1302. If there is insufficient transfer bandwidth available, control is directed to step 1309, and the portion will have to be pre-loaded during a subsequent frame. Alternatively, control is directed to step 1308, where texture pre-loading takes place.

If a texture has not yet been split into portions, control is directed from step 1304 to step 1306. At step 1306 the amount of data in a next texture required for a scene is identified. At step 1307 the texture is split according to its size and the estimate of available bandwidth made at step 1302. This usually results in several texture portions being created, although when a texture is small, splitting may not be necessary, and the entire texture can be transferred to texture memory 809 as a single portion.

At step 1308 the next texture portion is transferred to texture memory 809. This involves a DMA transfer from the main memory 806 to the graphics card 808, via the memory controller 805 and the crossbar switch 807. At step 1309 texture memory management is performed, in which texture portions from previous scenes may be deleted from texture memory 809 when they are no longer needed. At step 1310 next scene data may be loaded into main memory 806 as a background operation, from the hard disk drive 812. This operation is implemented as a separate executable thread, as are several other processing steps. However, in order to clarify the invention, these implementation issues are not detailed.

FIG. 14

Figure 14:
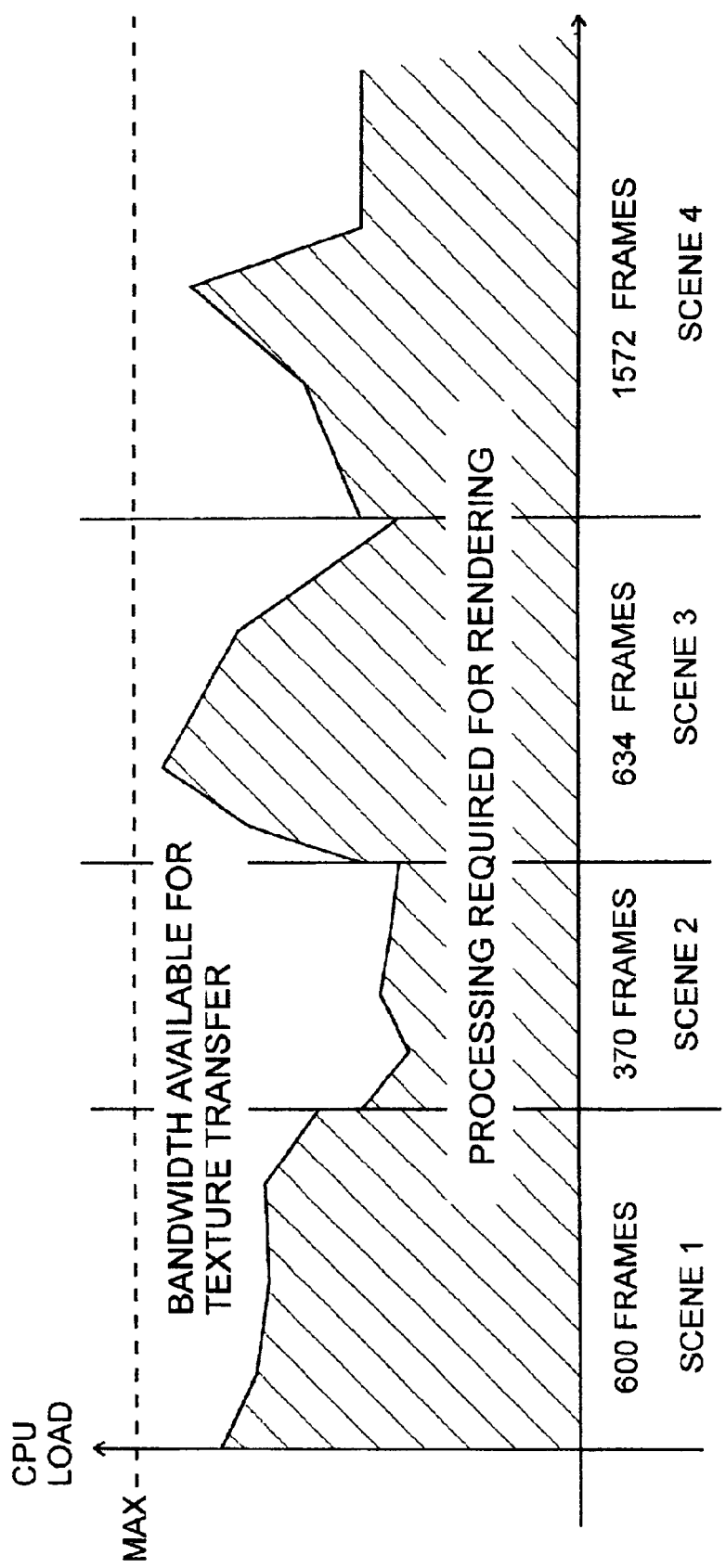
FIG. 14 shows a processing requirement graph for the scenes shown in FIGS. 3 to 6.

The actual bandwidth available for data transfer, estimated at step 1302 in FIG. 13, is illustrated in FIG. 14. The amount of processing required for each scene is different, and rendering requirements within a scene change as time goes by and the animation components become more or less computationally difficult to render. Adaptive statistical modelling is used to provide an estimate of the bandwidth that is likely to be available in the next few frames during the rendering of a particular scene. If the estimate is too low, then a frame deadline shall be missed, resulting in frame duplication. If the estimate is too high, a texture will require more frames to transfer than is necessary. However, even with this potential for inaccuracy, a prediction based on live statistics can still provide a quantitatively better performance under real time conditions. In practice the statistical model is set with a large margin of error, so that it is very unlikely that a frame deadline will be missed as a result of pre-loading a texture. It is rare that a texture will be large and the available bandwidth so low, that the texture cannot load in time for its use.

FIG. 15

Figure 15:
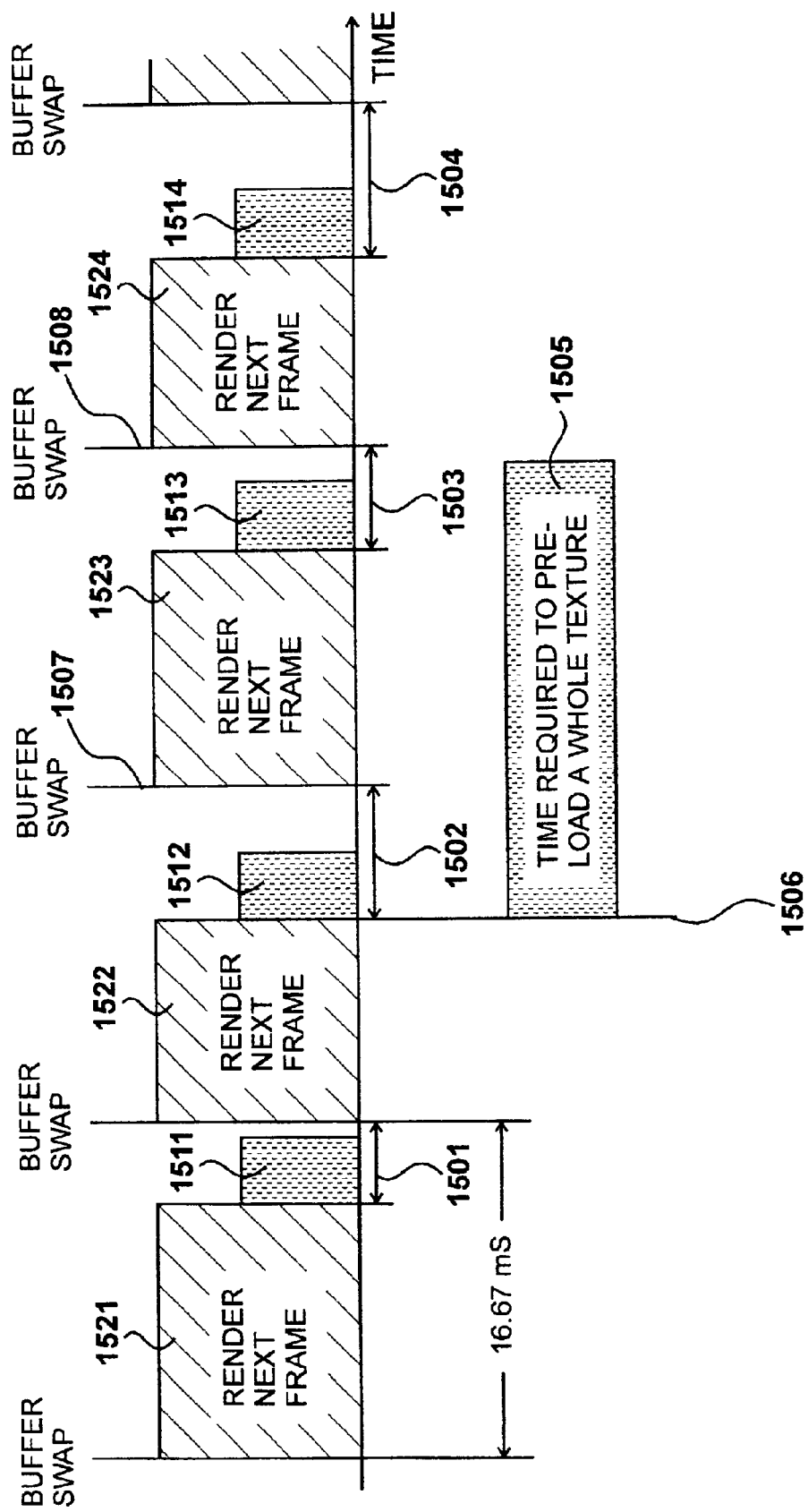
FIG. 15 details processing requirements for several frames during a single scene.

A graph of the processing load which occurs over a period of several frames is shown in FIG. 15. Each frame has a period of approximately 16.67 mS in which to be rendered, after which front and back buffers in the graphics card 808 are swapped, thus making the newly drawn animation frame visible. The amount of time taken by the central processing units 801 and 802 to render a frame is variable, resulting in a variable amount of free time 1501, 1502, 1503 and 1504 in which texture transfer, and other background operations can be performed.

A time required to transfer a whole texture is illustrated at 1505. If this were to be initiated at time point 1506, it is clear that the next frame would not be drawn, and the buffer swaps 1507 for the current frame and for the next frame at 1508, would both be missed. Instead, the texture is split into portions 1511, 1512, 1513, 1514 in accordance with the estimate of the available bandwidth 1501, 1502, 1503 and 1504 at each frame. This estimate is sufficiently conservative, that the texture portions transfer without interfering with rendering 1521, 1522, 1523 and 1524.

It would be possible to split all textures into extremely small portions, but this would have the result that large texture transfers take place over many frames, possibly running into what would have been the beginning of the scene for which they are required. The use of statistical analysis of bandwidth availability avoids this problem, and in conjunction with the texture splitting process, provides a technical solution to the problem of texture pre-loading in a real time processing environment.

FIG. 16

Figure 16:
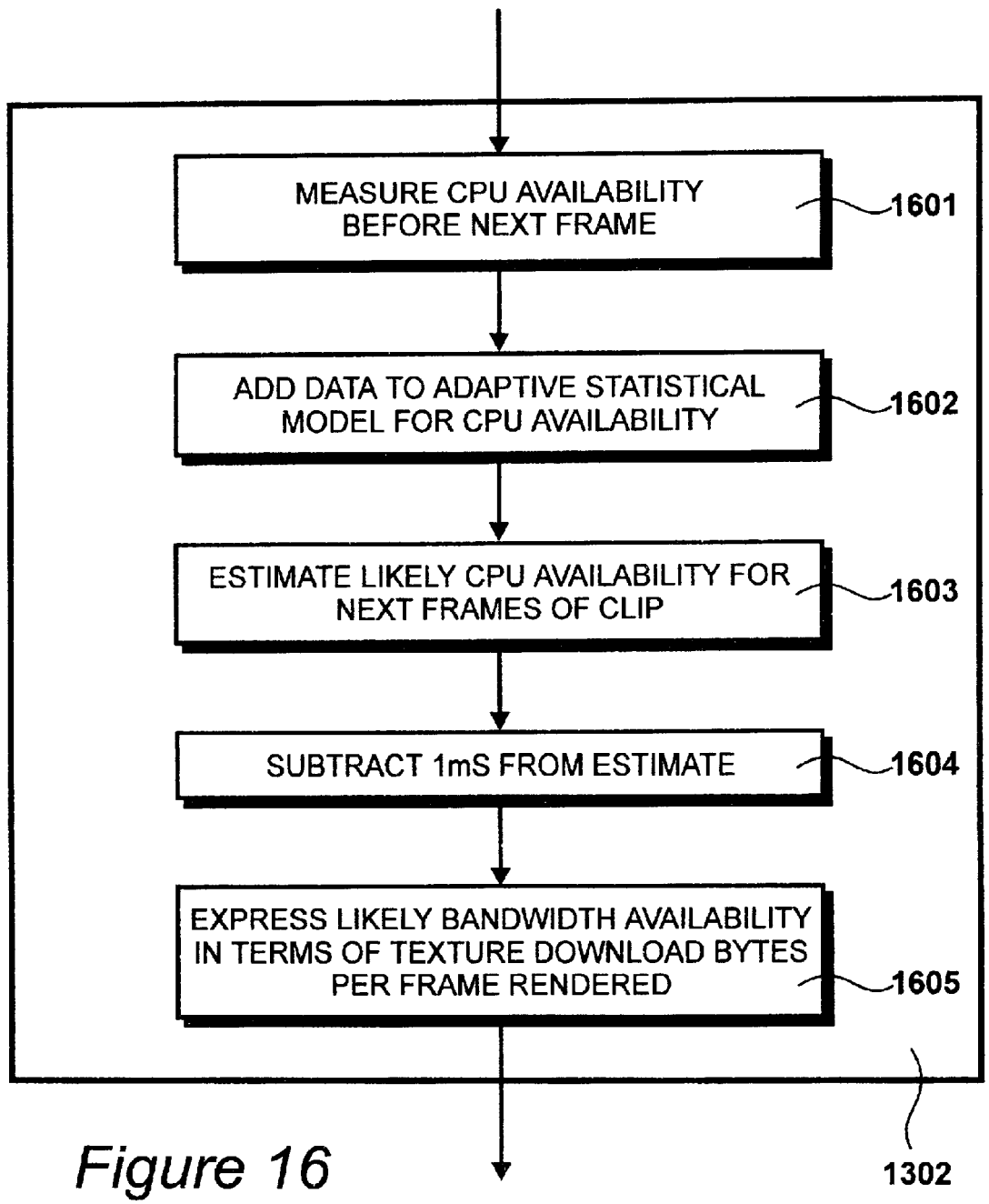
FIG. 16 details the step of estimating bandwidth shown in FIG. 13.

The step of estimating bandwidth availability performed at step 1302 in FIG. 13, is detailed in FIG. 16. At step 1601, the remaining processing time 1501 before the next buffer swap is measured. At step 1602 this data is added to an adaptive statistical model for CPU availability. At step 1603 the adaptive statistical model is interrogated to estimate the CPU availability for each of the next few frames of the clip. This value is expressed in milliseconds. At step 1604 one millisecond is subtracted from the estimate made at step 1603, providing an additional margin of error on top of the complex adaptive statistical model. At step 1605 the estimate is converted into an expression of the likely bandwidth availability in terms of the number of bytes that may be transferred to texture memory 809, per frame.

FIG. 17

Figure 17:
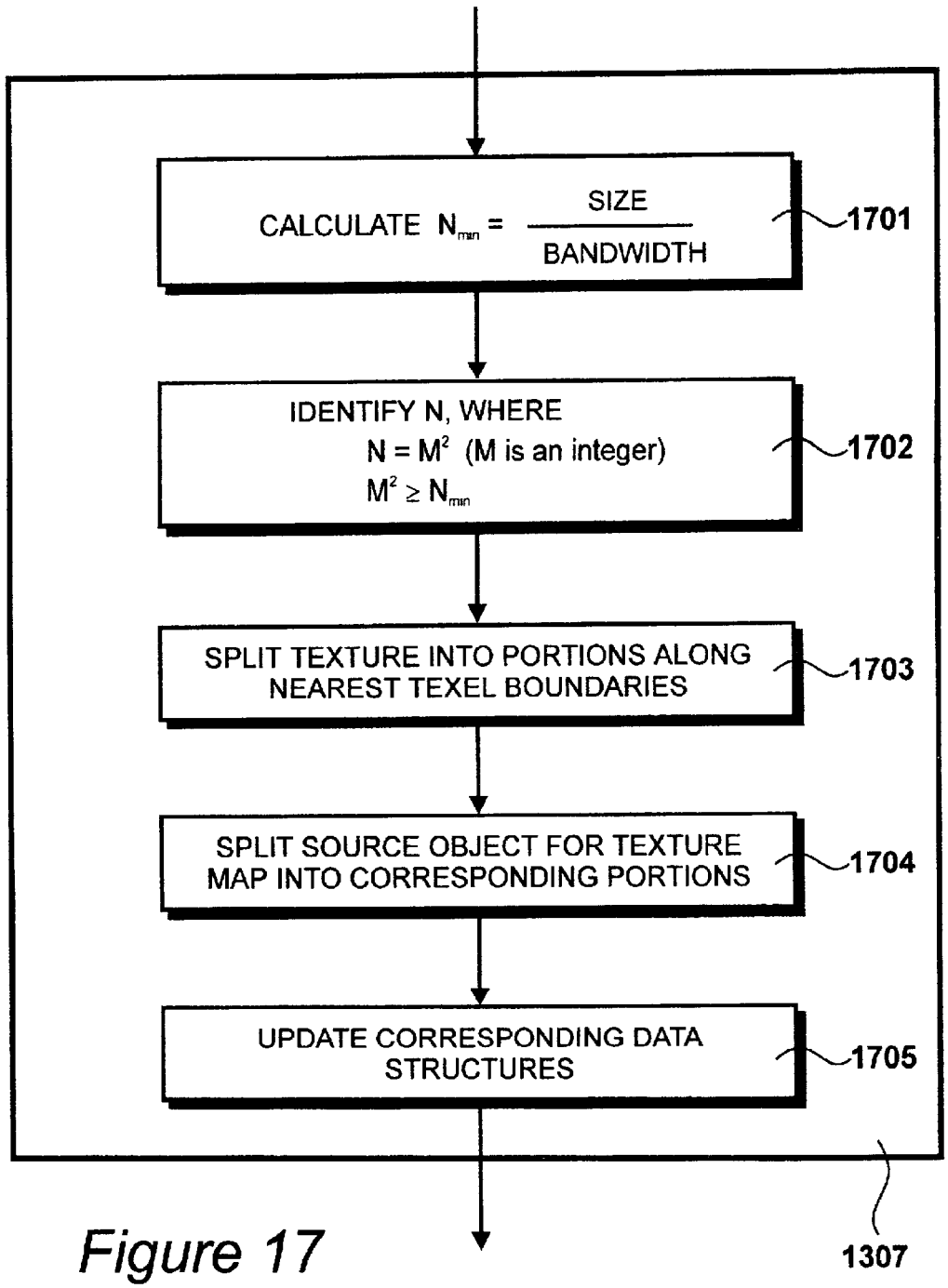
FIG. 17 details the step of splitting textures into portions shown in FIG. 13.

The process of splitting a texture into portions, shown at step 1307 in FIG. 13, is detailed in FIG. 17. At step 1701 a calculation is made of a minimum value, Nmin, of the number of portions into which the texture should be split. This is given by the equation:

$$Nmin = SIZE/BANDWIDTH$$

where SIZE is the number of bytes in the texture, and BANDWIDTH is the estimate of the number of bytes that may be transferred to texture memory per frame rendered.

At step 1702, Nmin is processed to identify a value, N, which is the actual number of portions that will be created. N is equal to or greater than Nmin, and N must be equal to M squared, where M is an integer, such that the texture is split horizontally and vertically into the same number of portions. The purpose of this is to identify suitable portions and their boundaries using a simple method. At step 1703, the texture is split into portions along texel boundaries. This often results in portions of slightly different sizes, due to texel quantisation. At step 1704 the source object, for example a rectangle, is itself split up into corresponding portions. This is necessary so that each texture portion can be mapped to a specific primitive shape for rendering. At step 1705 corresponding data structures are updated, including pointers to scene graph data, that reflect the changes made to the source object.

FIG. 18

The effect of the steps shown in FIG. 17 is shown in FIG. 18. A texture 1001 has been split up into portions 1801 to 1816, in accordance with the equation for Nmin, and then N. For example, Nmin might have been eleven, and the next suitable value for N would be sixteen. The result of this is that the texture 1001 has been split up into sixteen texture portions.

FIG. 19

Figure 19:
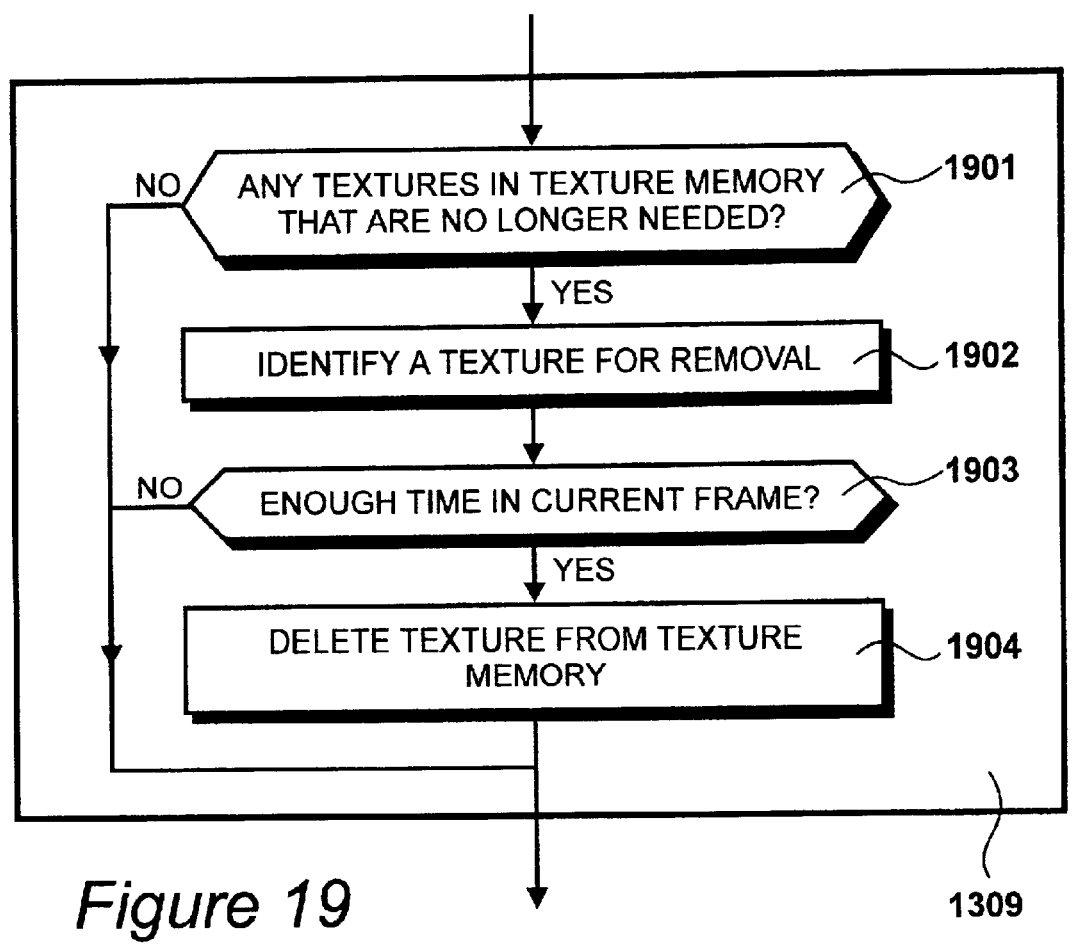
FIG. 19 details the step of texture management shown in FIG. 13.

The process of texture management, shown at step 1309 in FIG. 13, is detailed in FIG. 19. At step 1901 a question is asked as to whether there are any textures in the texture memory 809 that are no longer needed. If not, texture memory management is not performed. Alternatively, control is directed to step 1902. At step 1902 a texture requiring removal is identified. For the purposes of texture memory management, each texture portion is considered as a separate texture. At step 1903 a question is asked as to whether there is enough time remaining for the current frame, to delete the identified texture. If not, the texture is left in memory. Alternatively, control is directed to step 1904, where the graphics card memory manager performs deletion of the texture.

What is claimed is:

1. An apparatus for rendering animated image data in real time, comprising:

texture storage means;

data storage means configured to store data, including scene data, that defines a plurality of sequentially displayable scenes, each of which is rendered as an image sequence in real time, wherein data for each of said scenes includes a texture for the respective scene, that requires transfer to said texture storage means in advance of said scene being rendered; and central processing means and graphical processing means configured to perform operations to render said scenes, without a pause between scenes, said operations being under control of said central processing means, which is configurable to execute instructions for performing the steps of:

(a) rendering the next frame of the current scene;
(b) estimating a bandwidth availability for texture transfer that is unlikely to interfere with the real-time rendering of the current scene;
(c) identifying the amount of data in a texture required for rendering a next scene;
(d) splitting said required texture into texture portions that satisfy said bandwidth availability; and
(e) transferring one of said texture portions from said data storage means to said texture storage means using said available bandwidth while rendering, in real-time, the current scene.

2. Apparatus according to claim 1, wherein said estimating step (b) includes steps of:

(b1) measuring a processing availability with reference to a due time for a frame in a regularly updated frame sequence;
(b2) updating adaptive statistical model with said processing availability; and
(b3) obtaining an availability estimate from said updated adaptive statistical model.

3. Apparatus according to claim 1, wherein said splitting step (d) includes splitting said texture along texture pixels.

4. Apparatus according to claim 1, wherein said transferring step (e) is performed by a process of direct memory access.

5. Apparatus according to claim 1, wherein said texture storage means includes texture memory management means for deleting textures.

6. Apparatus according to claim 1, wherein said central processing means is configured to execute instructions for performing the additional steps of:

(f) selecting a texture for deletion from said texture storage means; and
(g) deciding whether to delete said selected texture in response to the time before the next frame is due to be rendered.

7. Apparatus according to claim 1, including image combining means for combining rendered animation images with images from a live video camera.

8. Apparatus according to claim 1, wherein said central processing means is configured to modify a scene animation projection in response to camera position data.

9. The apparatus of claim 1 wherein the available bandwidth occurs between the rendering of the next frame in the current scene and a buffer swap for rendering a subsequent frame in the current scene.

10. A method of rendering animated image data in real time without a pause between scenes comprising:

(a) rendering a next frame of a current scene, wherein each scene includes a texture that is transferred to a texture storage means in advance of rendering its respective scene;
(b) estimating a bandwidth availability for texture transfer that is unlikely to interfere with real-time rendering of the current scene;
(c) identifying the amount of data in a texture required for rendering a next scene;
(d) splitting said required texture into texture portions that satisfy said bandwidth availability; and
(e) transferring one of said texture portions from a data storage means to the texture storage means using said available bandwidth while rendering, in real-time, the current scene, wherein the data storage means includes scene data defining a plurality of sequentially displayable scenes.

11. A method according to claim 10, wherein said estimating step (b) includes the steps of:

(b1) measuring a processing availability with reference to a due time for a frame in a regularly updated frame sequence;
(b2) updating an adaptive statistical model with said processing availability; and
(b3) obtaining availability estimate from said updated adaptive statistical model.

12. A method according to claim 10, wherein said splitting step (d) includes splitting said texture along texture pixels.

13. A method according to claim 10, wherein said transferring step (e) is performed by a process of direct memory access.

14. A method according to claim 10, including deleting textures from said texture storage means.

15. A method according to claim 10, further comprising:

(f) selecting a texture for deletion from said texture storage means; and
(g) deciding whether to delete said selected texture in response to an assessment of the time available before the next frame is due to be rendered.

16. A method according to claim 10, further comprising combining rendered animation images with images from a live video source.

17. A method according to claim 10, further comprising modifying a scene animation projection in response to camera position data.

18. The method of claim 10 wherein the available bandwidth occurs between the rendering of the next frame in the current scene and a buffer swap for rendering a subsequent frame in the current scene.

19. An article of manufacture comprising a program storage medium readable by a computer and embodying one or more instructions executable by the computer to perform a method for rendering image data, the method comprising:

(a) storing data including scene data that defines a plurality of sequentially displayable scenes to be rendered as an image sequence in real time, wherein data for each said scene includes a texture for the respective scene that is transferred to storage in advance of its rendering;
(b) rendering a next frame of a current scene;
(c) estimating a bandwidth availability for texture transfer that is unlikely to interfere with the real time rendering of the current scene;
(d) identifying an amount of data in a texture required for rendering the next scene;
(e) splitting said required texture into one or more texture portions that satisfy said bandwidth availability; and
(f) transferring one of said texture portions to storage using said available bandwidth while rendering, in real-time, the current scene.

20. An article of manufacture according to claim 19, wherein the estimating further comprises:

measuring a processing availability with reference to a due time for a frame in a regularly updated frame sequence;

updating an adaptive statistical model with said processing availability; and obtaining an availability estimate from said updated adaptive statistical model.

21. An article of manufacture according to claim 19 wherein the splitting further comprises splitting said texture along texture pixel.

22. An article of manufacture according to claim 19, wherein the method further comprises:

(f) selecting a texture for deletion from said texture storage means; and (g) deciding whether to delete said selected texture in response to the time before the next frame is due to be rendered.

23. An article of manufacture according to claim 19, wherein the method further comprises combining rendered animation images with images from a video source.

24. An article of manufacture according to claim 19, wherein the method further comprises modifying a scene animation projection in response to camera position data.

25. The article of manufacture of claim 19 wherein the available bandwidth occurs between the rendering of the next frame in the current scene and a buffer swap for rendering a subsequent frame in the current scene.

* * * * *

UNITED STATES PATENT AND TRADEMARK OFFICE
CERTIFICATE OF CORRECTION

PATENT NO. : 6,987,516 B2 Page 1 of 1
APPLICATION NO. : 09/994123
DATED : January 17, 2006
INVENTOR(S) : Jean Luc Dery It is certified that error appears in the above-identified patent and that said Letters Patent is hereby corrected as shown below:

Column 11, line 29, for claim 2, insert --an-- before "adaptive statistical model".

Signed and Sealed this

Twenty-fourth Day of October, 2006

JON W. DUDAS
*Director of the United States Patent and Trademark Office*